United States Patent
Herrmann et al.

(10) Patent No.: US 11,822,717 B2
(45) Date of Patent: Nov. 21, 2023

(54) METHOD AND DEVICE FOR RECOGNIZING A VIEWING DIRECTION AND/OR A STATE OF AN EYE USING A LASER DEVICE AND LASER DEVICE

(71) Applicant: Robert Bosch GmbH, Stuttgart (DE)

(72) Inventors: Alexander Herrmann, Reutlingen (DE); Johannes Meyer, Haseluenne (DE); Matthias Falk, Aichtal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/876,086

(22) Filed: Jul. 28, 2022

(65) Prior Publication Data

US 2023/0040956 A1    Feb. 9, 2023

(30) Foreign Application Priority Data

Aug. 5, 2021 (DE) ..................... 10 2021 208 484.2

(51) Int. Cl.
G06F 3/01 (2006.01)
G02B 27/00 (2006.01)

(52) U.S. Cl.
CPC ......... *G06F 3/013* (2013.01); *G02B 27/0093* (2013.01)

(58) Field of Classification Search
CPC .... G06F 30/013; G06F 3/013; G02B 27/0093
See application file for complete search history.

(56) References Cited

U.S. PATENT DOCUMENTS

| | | | |
|---|---|---|---|
| 2020/0085312 A1* | 3/2020 | Tzvieli | A61B 5/02055 |
| 2020/0149864 A1 | 5/2020 | Kinrot et al. | |
| 2022/0155860 A1* | 5/2022 | Tzvieli | G06V 40/166 |

FOREIGN PATENT DOCUMENTS

| | | |
|---|---|---|
| DE | 102020127593 A1 | 4/2022 |
| WO | 2019055839 A2 | 3/2019 |

* cited by examiner

*Primary Examiner* — Bryan Earles
(74) *Attorney, Agent, or Firm* — NORTON ROSE FULBRIGHT US LLP; Gerard Messina (57) ABSTRACT

A method for recognizing a state of an eye for a laser device. The method includes reading in an eye parameter using the laser device, which represents a movement of the eye. The eye parameter is compared with a first and/or with a second reference parameter in order to obtain a comparison result. A type of movement of the eye is determined using the comparison result, which represents a saccadic eye movement when the eye parameter has a greater value than the first reference parameter. The type of movement represents a smooth eye movement when the eye parameter has a value which corresponds to the second reference parameter and at most to the first reference parameter. A viewing direction is ascertained as a function of the determined type of movement.

14 Claims, 4 Drawing Sheets

METHOD AND DEVICE FOR RECOGNIZING A VIEWING DIRECTION AND/OR A STATE OF AN EYE USING A LASER DEVICE AND LASER DEVICE

CROSS REFERENCE

The present application claims the benefit under 35 U.S.C. § 119 of German Patent Application No. DE 10 2021 208 484.2 filed on Aug. 5, 2021, which is expressly incorporated herein by reference in its entirety.

FIELD

The present invention is directed to a method and to a device for recognizing a viewing direction and/or a state of an eye using a laser device, as well as a laser device. The subject matter of the present invention is also a computer program.

BACKGROUND INFORMATION

Systems and methods for detecting the viewing direction in VR and AR applications are described in various embodiments and in the related art. Camera-based video-oculography systems (VOG) as well as self-mixing laser Doppler interferometry (SMI)-based approaches are mentioned by way of example.

German Patent Application No. DE 10 2020 127 593 describes a measurement of the eye velocity and thus an eye movement with the aid of SMI as well as the combination with a VOG-based eye-tracking system.

SUMMARY

An improved method for recognizing a viewing direction and/or a state of an eye using a laser device and an improved laser device, furthermore, a device which uses this method, and finally a corresponding computer program are provided according to the present invention. Advantageous refinements of and improvements on the device disclosed herein are possible with the measures disclosed herein.

The present invention provides a possibility to reduce an energy consumption, for example, in smart glasses. Using the approach presented herein according to the present invention, it is precisely this energy-efficient possibility that may recognized and/or carried out in an automated manner.

According to an example embodiment of the present invention, a method for recognizing a state of a viewing direction and/or of an eye using a laser device is provided, the method including a step of reading in, a step of comparing, a step of determining, and a step of ascertaining. In the step of reading in, an eye parameter is read in using the laser device, the eye parameter representing a movement of the eye. In the step of comparing, the eye parameter is compared with a first reference parameter and additionally or alternatively with a second reference parameter differing from the first reference parameter in order to obtain a comparison result. In the step of determining, a type of movement of the eye is determined using the comparison result, the type of movement representing a saccadic eye movement when the eye parameter has a greater value than the first reference parameter. In addition or alternatively, the type of movement represents a smooth eye movement when the eye parameter has a value, which corresponds to and/or is equal to at least the second reference parameter and at most the first reference parameter. In the step of ascertaining, a viewing direction is ascertained as a function of the determined type of movement. The viewing direction is ascertained, in particular, when the type of movement represents the smooth eye movement. In addition or alternatively, the viewing direction is not ascertained when the type of movement represents the saccadic eye movement. In this case, a state of the eye is recognized, in which no information is captured by the eye.

The method may, for example, be carried out in conjunction with smart glasses. The reference parameters may, for example, also be stored [in] a memory unit. The reference parameters may advantageously function as threshold values. The type of movement may, for example, represent a movement pattern of the eye. The saccadic eye movement may thereby represent, for example, an abrupt eye movement, whereas the smooth eye movement may represent, for example, a reading process and, therefore, a continuous eye movement.

According to one specific example embodiment of the present invention, a value may be read in as the eye parameter in the step of reading in, which represents an angle velocity and additionally or alternatively an acceleration of the eye. The velocity and additionally or alternatively the movement may be detected, for example, primarily by very energy-efficient analog fringe counting. In addition, the significantly more precise but more energy-intensive velocity detection may, if needed, be connected after detection by an analysis of the frequency spectrum, for example, with the aid of a Fourier transform. The detection of the velocity in the approach presented herein may be advantageously carried out with the aid of fringe counting, a Fourier transform or with the aid of a combination of both options.

In the step of determining, the type of movement may further be determined as a smooth eye movement when the angle velocity is within a range between 25°/s and 80°/s, in particular, between 30°/s and 75°/s. According to one specific embodiment, the type of movement may be determined in the step of determining as a saccadic eye movement when the angle velocity is in a range between 180°/s and 520°/s, in particular, between 200°/s and 500°/s. The use of such parameters may enable a rapid, safe, and unambiguous determination of the eye movement.

According to an example embodiment of the present invention, the steps of the method may further be repeated at repeating intervals, a length of the repeating intervals being capable of being a function of the eye parameter if, in the step of determining, the type of movement has been determined to be the smooth eye movement. The length of the repeating intervals in the case of a large eye parameter may, in particular, be shorter than in the case of a small eye parameter. Time may be advantageously considered to be the variable measure for the repeating intervals, so that, for example, temporal distances between the individual repetitions of the steps may be shortened or extended as a function of the angle velocity.

According to one specific example embodiment of the present invention, the steps of the method may be repeated in repeating time spans, a length of one of the repeating time spans being capable of being increased when the eye parameter is smaller than the second reference value. In this way, for example, a fixation point may be ascertained and, accordingly, an energy-saving mode of the laser device may be advantageously activated, for example, using a pause signal.

According to an example embodiment of the present invention, the steps of the method may also be repeated at a repeating frequency if, in the step of determining, the type of movement is determined to be the saccadic eye movement. The repeating frequency may, in particular, be a function of the eye parameter or of a predefined frequency parameter. The predefined frequency parameter may be advantageously stored, for example, in a memory unit.

According to one specific example embodiment of the present invention, the type of movement may be determined in the step of determining to be a state of fixation of the eye when the eye parameter is smaller than the second reference parameter or threshold value. The eye advantageously focuses, for example, on an object in the state of fixation and alternates, for example, with a saccadic movement. This means that the eye is able, for example, to rest on an object before it sights a new object.

A step of generating the eye parameter may further be carried out prior to the step of reading in, the eye parameter being capable of being generated using a self-mixing laser Doppler interferometry.

In the step of generating, a light beam may be output in the direction of the eye and a reflection beam may be received, the light beam being capable of being output in an angular range between 40° and 50° relative to at least one of the main rotational axes of the eye. In addition or alternatively, the reflection beam may be received in an angular range between 40° and 50° relative to at least one of the main rotational axes of the eye, the reflection beam, in particular, being capable of being formed as a partial beam of the light beam. The main rotational axes may, for example, extend vertically and additionally or alternatively horizontally with respect to a head pose of a user. This may advantageously prevent a user, for example, from being blinded by the light beam.

This method may be implemented, for example, in software or in hardware or in a mixed form of software and hardware, for example, in a control unit.

The present invention further provides a device, which is designed to carry out, activate or implement the steps of a variant of the method presented herein in corresponding units. With this embodiment variant of the approach in the form of a device as well, it is possible to rapidly and efficiently achieve the object underlying the approach.

For this purpose, according to an example embodiment of the present invention, the device may include at least one processing unit for processing signals or data, at least one memory unit for storing signals or data, at least one interface to a sensor or to an actuator for reading in sensor signals from the sensor or for outputting data signals or control signals to the actuator and/or at least one communication interface for reading in or outputting data, which are embedded in a communication protocol. The processing unit may, for example, be a signal processor, a microcontroller or the like, the memory unit being capable of being a flash memory, an EPROM or a magnetic memory unit. The communication interface may be designed to read in or output data wirelessly and/or in a hardwired manner, a communication interface, which is able to read in or output hardwired data, being capable, for example, of reading in these data electrically or optically from a corresponding data transmission line or outputting these data into a corresponding data transmission line.

A device in the present case may be understood to mean an electrical device, which processes sensor signals and, as a function thereof, outputs control signals and/or data signals. The device may include an interface, which may be designed in hardware and/or in software. In a hardware design, the interfaces may, for example, be part of a so-called system ASIC, which contains a wide variety of functions of the device. It is also possible, however, for the interfaces to be separate, integrated circuits or to be made at least partly of discrete components. In a software design, the interfaces may be software modules, which are present, for example, on a microcontroller alongside with other software modules.

According to an example embodiment of the present invention, also advantageous is a computer program product or computer program having program code, which may be stored on a machine-readable medium or memory medium, such as a semiconductor memory, a hard disk memory or an optical memory, and which is used for carrying out, implementing and/or activating the steps of the method according to one of the above-described specific embodiments, in particular, when the program product or program is executed on a computer or on a device.

An example embodiment of the present invention further provides a laser device for recognizing a state of the eye is further presented, which includes a laser unit for receiving a reflection beam and a device in a variant mentioned above.

The laser device may be advantageously used in connection with smart glasses. The laser unit in this case may, for example, include a light source of the laser device and may, for example, be designed to output a light beam and to receive the reflection beam reflected as a partial beam of the light beam. The device may, for example, be formed as a control unit.

BRIEF DESCRIPTION OF THE DRAWINGS

Exemplary embodiments of the present invention are represented in the figures and explained in greater detail in the following description.

DETAILED DESCRIPTION OF EXAMPLE EMBODIMENTS

In the following description of preferred exemplary embodiments of the present invention, identical or similar reference numerals are used for elements which are represented in the various figures and act similarly, a repeated description of these elements being omitted.

Figure 1:
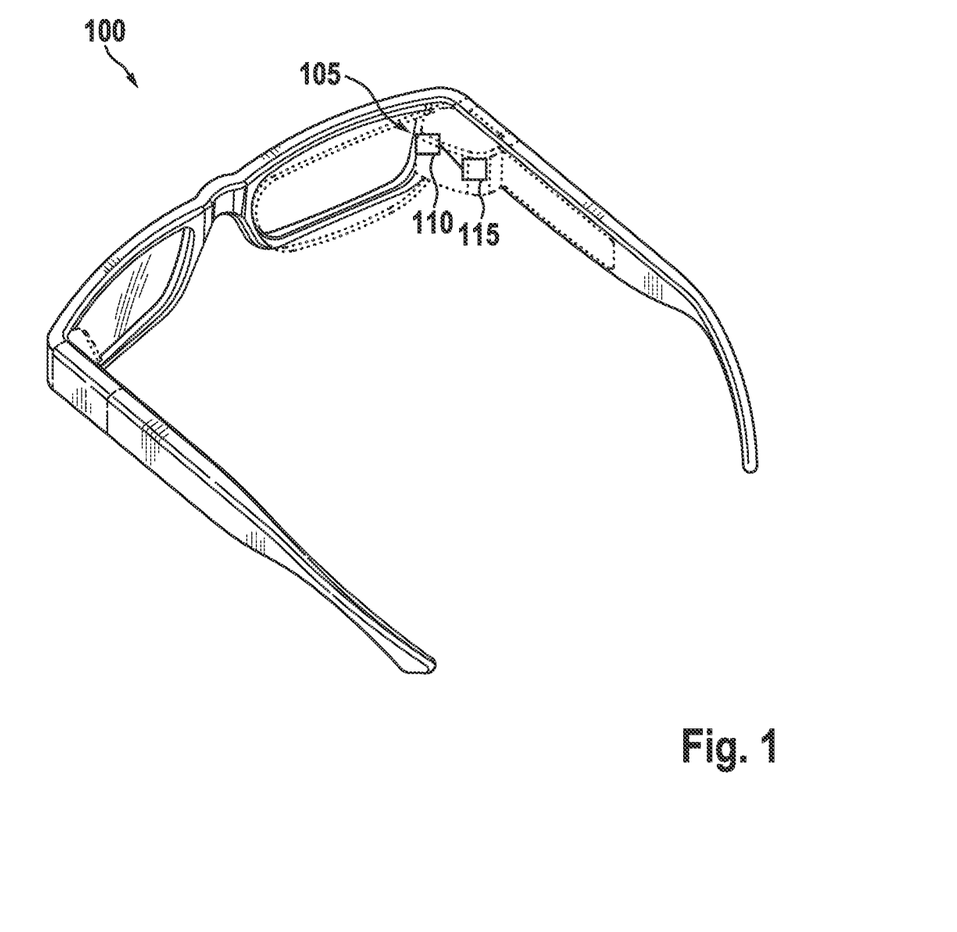
FIG. 1 schematically shows a representation of a set of smart glasses including a laser device according to one specific embodiment of the present invention.

FIG. 1 schematically shows a representation of a set of smart glasses 100 including a laser device 105 according to one exemplary embodiment. Laser device 105 is designed to recognize a state of an eye and includes for this purpose a laser unit 110 for receiving a reflection beam as well as a device 115. Laser unit 110 according to this exemplary embodiment is designed to also output a light beam before it receives the reflection beam. Device 115 is further formed, for example, as a control unit, which is designed to activate and/or to carry out a method for recognizing a state of the eye, as it is explained in greater detail in one of the following figures.

In other words, laser device 105 is designed to enable an energy-efficient operating mode in systems for detecting a viewing direction, which is also referred to as eye tracking, for use in, for example, augmented reality (AIR) and virtual reality (VR) smart glasses 100.

In principle, a movement of the eyes is subdivided into two movement types: abrupt saccadic movements and smooth pursuit movements.

Saccadic movements are designed to detect the surroundings context. This means that both eyes of the observer move synchronously in rapid saccadic motions between so-called fixation points with a movement duration of an average of 50 ms and angle velocities between 200°/s and 500°/s. At the fixation points, the eye is largely at rest, aside from very small movements, so-called micro-saccades. The dwell time at fixation points is usually within a range between 100 ms and 500 ms. The detection of pieces of image information in the brain takes place in each case at the fixation points, whereas, for example, no detection of pieces of image information takes place during the rapid saccadic movements.

Smooth pursuit movements are carried out, for example, in order to follow an object. In contrast to the saccadic movements, the eye does not jump from fixation point to fixation point, but follows the object to be tracked in a smooth, slow movement at angle velocities within a range between 30°/s and 75°/s. The brain of the observer detects the object during the slow pursuit movement.

If, for example, the eye is closed, no image processing takes place in the brain. The detection of the viewing direction in this state is not possible and not meaningful. The state of the closed eyes is determinable, for example, with the aid of SMI sensors via the opening and closing of the eye lid, the distance between eye and sensor as well as of a signal-to-noise ratio.

Figure 2:
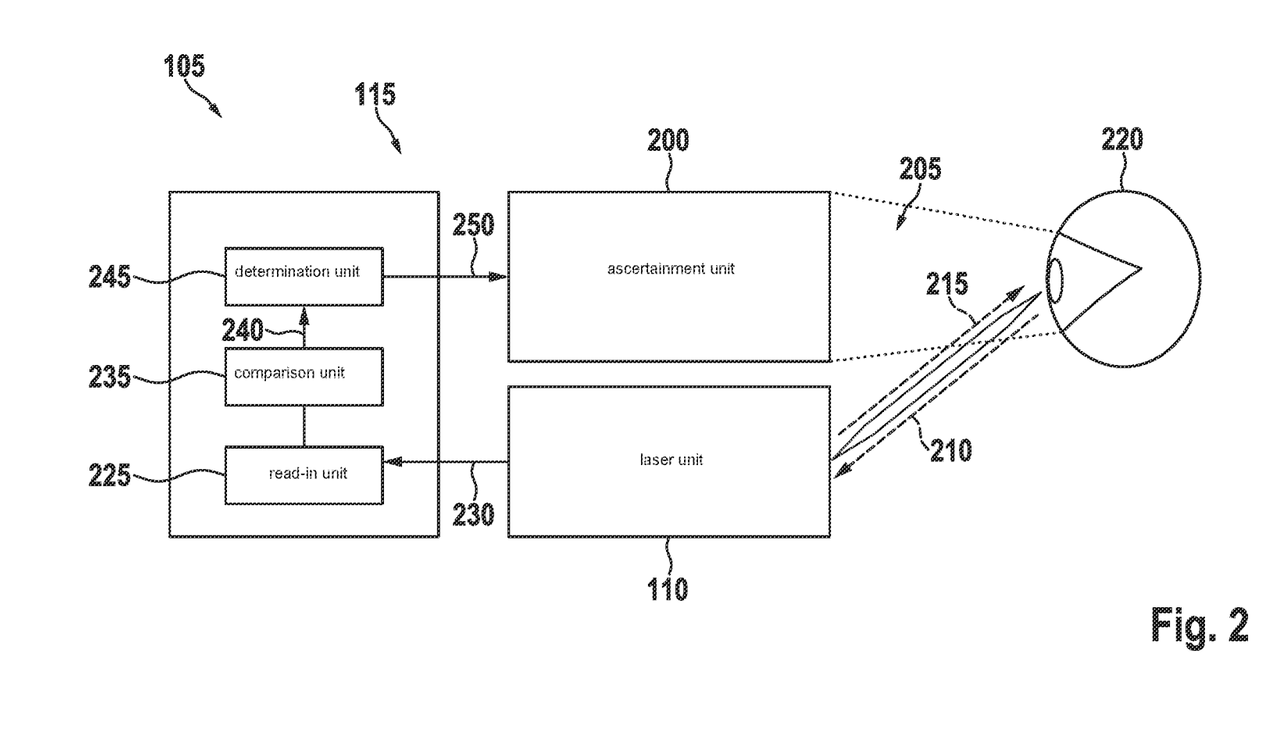
FIG. 2 schematically shows a representation of one exemplary embodiment of a laser device of the present invention.

FIG. 2 schematically shows a representation of one exemplary embodiment of a laser device 105. Depicted laser device 105 corresponds to or resembles, for example, laser device 105 described in FIG. 1. According to this exemplary embodiment, laser device 105 includes laser unit 110 as well as device 115. Laser device 105 according to this exemplary embodiment also includes an ascertainment unit 200, which is designed to ascertain a viewing direction 205 and/or an eye position. Ascertainment unit 200 is, for example, formed to be integrated into device 115 and according to this exemplary embodiment is designed externally of the device. In laser device 105 represented in FIG. 2 as well, laser unit 110 is designed to receive a reflection beam 210, which has been output by laser unit 110 as light beam 215. According to this exemplary embodiment, laser unit 110 is designed to interfere light beam 215 and reflection beam 210 with one another, for example, with the aid of self-mixing laser Doppler interferometry (SMI).

Device 115 is designed to activate a method for recognizing a state of an eye 220 for laser device 105. For this purpose, device 115 according to this exemplary embodiment includes a read-in unit 225, which is designed to read in an eye parameter 230, which represents a movement of eye 220. Device 115 further includes a comparison unit 235, which is designed to compare eye parameter 230 with a first reference parameter and/or with a second reference parameter differing from the first reference parameter, in order to obtain a comparison result 240. Device 115 further includes a determination unit 245, which is designed to determine a type of movement 250 of eye 220 using comparison result 240. Type of movement 250 in this case represents a saccadic eye movement when eye parameter 230 has a greater value than the first reference parameter. In addition or alternatively, type of movement 250 represents a smooth eye movement when eye parameter 230 has a value that corresponds to the second reference parameter and at most the first reference parameter. Ascertainment unit 200 is designed as mentioned above to ascertain viewing direction 205 as a function of determined type of movement 250, in particular, when the type of movement represents the smooth eye movement. In contrast, the viewing direction is not ascertained by ascertainment unit 200 when type of movement 250 represents the saccadic eye movement.

In other words, a system architecture of a system for the energy-efficient detection of viewing direction 205 by dynamically establishing the measuring points in time on the basis of SMI eye movement data is represented in FIG. 2.

Figure 3:
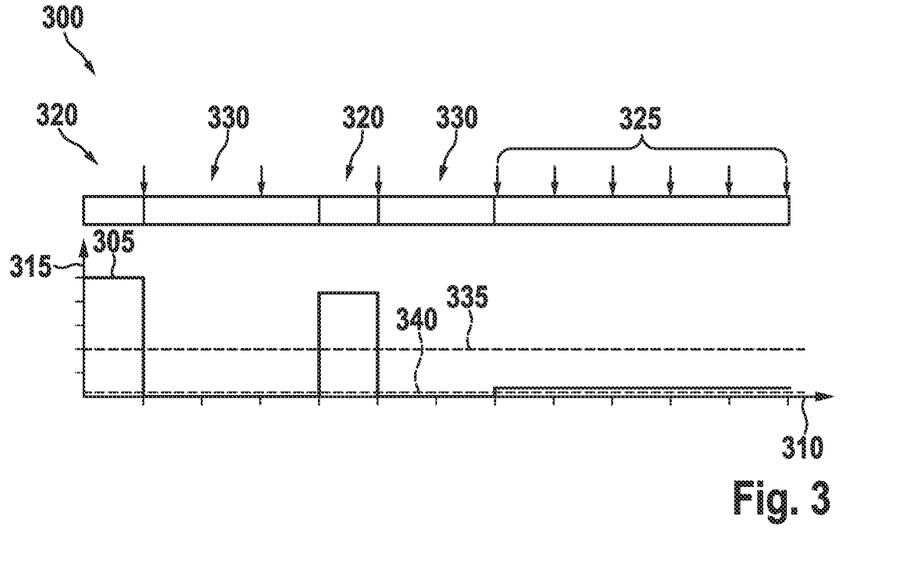
FIG. 3 shows a diagram illustration of a movement pattern of an eye movement for explaining the approach according to one exemplary embodiment of the present invention.

FIG. 3 shows a diagram illustration of a movement pattern 300 of an eye movement for explaining the approach according to one exemplary embodiment. Depicted curve 350 in this case represents the type of movement of the eye, which is ascertained, for example, using a device as it has been described in FIG. 2. X-axis 310 of the diagram represents the time and y-axis 315 according to this exemplary embodiment represents an angle velocity of the eye. According to this exemplary embodiment, both saccadic eye movement 320 and smooth eye movement 325 are represented. The saccadic eye movement is understood, for example, to be an abrupt, rapid eye movement, which takes place, for example, before a fixation point 330. This means that the eye jumps at a high velocity until it has reached a fixation point 330. If it disengages itself from such a fixation point 330, a further saccadic, abrupt movement takes place. A distinction in the types of movement according to this exemplary embodiment is a function of a first reference parameter 335 and of a second reference parameter 340 as threshold values. If, for example, the eye fixates on an object, the angle velocity of the eye according to this exemplary embodiment is below second reference parameter 340 and defines thereby fixation point 330 as a rest position of the eye. This means that during saccadic eye movement 320, the angle velocity of the eye has a value that is above first reference parameter 335. In contrast, smooth eye movement 325 is recognized as such when the eye moves at an angular velocity, whose value is between first reference parameter 335 and second reference parameter 340.

According to this exemplary embodiment, a measuring time period is represented, in which eye movements 320, 325 are recognized. Within this measuring time period, a repeating frequency of individual measurements differs, since it is a function of the eye parameter or of a predefined frequency parameter, for example, of the angle velocity. The measurements represent, for example, the method, for example, repetitions of the associated method steps. For example, a length of repeating intervals is a function of the eye parameter, i.e., according to this exemplary embodiment, of the angle velocity when the type of movement has been determined to be smooth eye movement 325. The length of the repeating intervals in the case of a large eye parameter is shorter than in the case of a small eye parameter. If saccadic eye movement 320 has been determined, a length of the repeating time spans increases if the eye parameter is smaller than second reference parameter 340.

In other words, an energy-efficient control of a system for measuring the viewing direction by dynamically establishing the measuring points in time on the basis of the eye movement is represented. Using, for example, laser sensors, it is possible to detect the velocity of the eye and, therefore, eye movement 320, 325 with the aid of self-mixing laser Doppler interferometry (SMI) in a very energy-efficient and high-frequency manner, for example, up to 1 kHz. The movement information is utilized in the approach presented herein for recognizing the type of movement of the eyes and for controlling the energy-intensive system for detecting the viewing direction, for example VOG, in a preferably energy-efficiently manner. In the process, a determination of the viewing direction takes place, for example, not at an established frequency, but dynamically as a function of the movement state of the eyes. During saccadic eye movement 320, no detection of the viewing direction takes place according to this exemplary embodiment, since the pieces of image information are not processed by the brain and, therefore, the viewing direction for imaging system (VR/AR) or systems for detecting the interest or the attention of the user are not relevant. In the case of camera-based VOG systems, for example, a correct detection of the viewing direction is further hampered due to the movement blur during a saccadic eye movement 320. The detection of the viewing direction is triggered, for example, at a temporal start of a fixation position 330. Although the viewing direction usually does not significantly change during fixation phase 330, a determination of the viewing direction is optionally repeatable as a function of the duration of fixation phase 330.

During smooth eye movement 325, the determination of the viewing direction takes place, for example, at regular intervals in a dynamic frequency as a function of the movement velocity of the eye. In other words, the higher the velocity is, the higher is the detection frequency to be selected. Alternatively, the detection frequency is selectable as a function of the integration of the velocity over time as a measure of the change of the viewing direction. This means that the viewing direction is detected, for example, upon reaching a threshold value of the integration.

The recognition of the type of movement takes place, for example, via a discrimination of velocity ranges of eye movements 320, 325. This is possible, for example, with the aid of a threshold recognition. In one further embodiment, it is possible to use additionally or exclusively pieces of acceleration information for recognizing changes in velocity.

Figure 4:
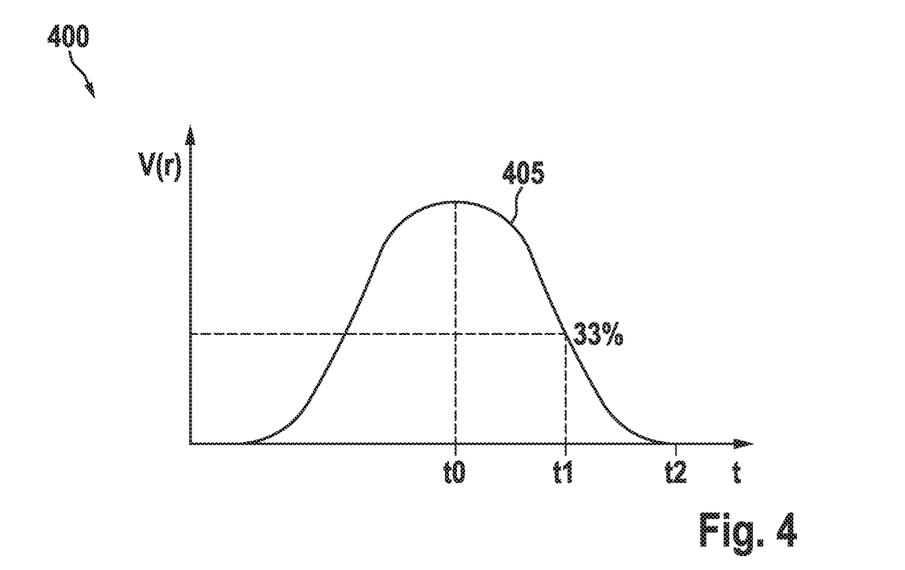
FIG. 4 shows a velocity-time diagram including a ballistic curve for explaining the approach according to one exemplary embodiment of the present invention.

FIG. 4 shows a velocity-time diagram 400 including a ballistic curve 405 for explaining the approach according to one exemplary embodiment. According to this exemplary embodiment, velocity-time diagram 400 represents merely by way of example a velocity profile for a laser device, as it has been described, for example, in one of FIGS. 1 through 2. Utilizing ballistic velocity profiles of the eye, a point in time of the standstill is predictable already before the completion of the movement by ascertaining the maximum velocity of ballistic curve 405. As a result, it is possible, for example, to awaken a detection system from an energy-saving mode and to shift it into the receptive state already before the completion of the movement, so that a viewing direction may be ascertained immediately upon standstill of the eye. According to this exemplary embodiment, this therefore represents exemplary ballistic velocity curve 405. The velocity increases at the start of the saccade until a maximum velocity is reached (t0). It subsequently drops with a similar curve characteristic. At point in time t1, a signal may be sent to the detection system, so that a viewing direction is immediately detectable at point in time t2.

Figure 5:
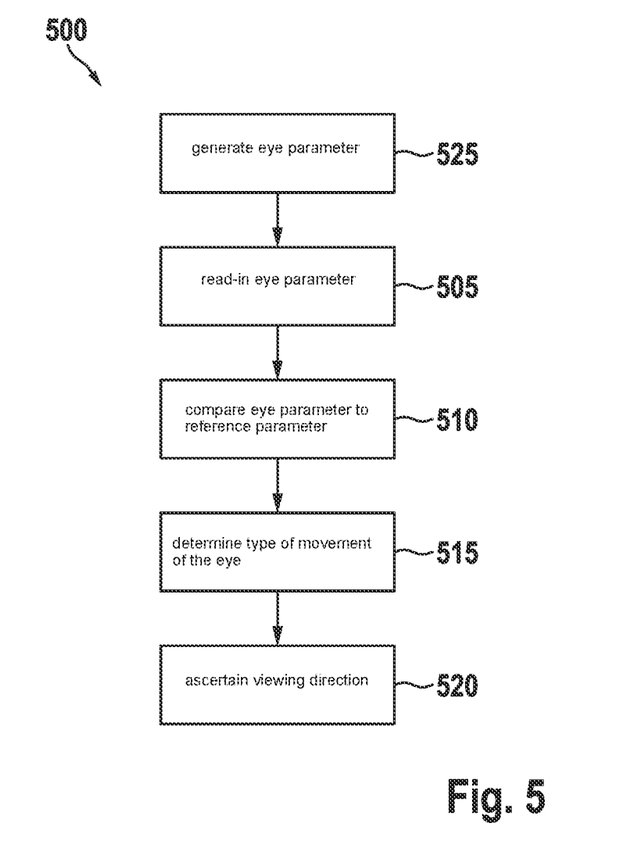
FIG. 5 shows a flowchart of a method according to one exemplary embodiment of the present invention for recognizing a viewing direction and/or a state of an eye using a laser device.

FIG. 5 shows a flowchart of a method 500 according to one exemplary embodiment for recognizing a viewing direction and/or a state of an eye using a laser device. This may be a method 500, which is implementable by one of the devices described with reference to preceding FIGS. 1 through 2. Method 500 includes for this purpose a step 505 of reading in, a step 510 of comparing, a step 515 of determining, and a step 520 of ascertaining. In step 505 of reading in, an eye parameter is read in using the laser device, which represents a movement of an eye, for example, an angle velocity and/or an acceleration of the eye. In step 510 of comparing, the eye parameter is compared with a first reference parameter and/or with a second reference parameter differing from the first reference parameter, in order to obtain a comparison result. In step 515 of determining, a type of movement of the eye is determined using the comparison result. The type of movement represents a saccadic eye movement when the eye parameter has a greater value than the first reference parameter. The type of movement represents additionally or alternatively a smooth eye movement when the eye parameter has a value, which corresponds to or is equal to at least the second reference parameter and at most to the first reference parameter. In step 520 of ascertaining, a viewing direction is ascertained as a function of the determined type of movement. The viewing direction is ascertained, in particular, when the type of movement represents the smooth eye movement and/or when the type of movement represents the saccadic eye movement.

Method 500 includes merely optionally a step 525 of generating the eye parameter prior to step 505 of reading in, the eye parameter in step 525 of generating being generated using a self-mixing laser Doppler interferometry. In the process, a light beam is output, for example, in the direction of the eye and a reflection beam is received. The light beam in this case is output, for example, in an angular range between 40° and 50° relative to at least one of the main rotational axes of the eye and/or the reflection beam is received in an angular range between 40° and 50° relative to at least one of the main rotational axes of the eye. The reflection beam in this case is formed as a partial beam of the light beam.

According to this exemplary embodiment, the type of movement in step 515 of determining is determined to be a smooth eye movement when the angle velocity is in a range between 25°/s and 80°/s, in particular, between 30°/s and 75°/s. The type of movement is additionally or alternatively determined in step 515 of determining to be a saccadic eye movement when the angle velocity is in a range between 180°/s and 520°/s, in particular, between 200°/s and 500°/s. The steps 505, 510, 515, 520, 525 of method 500 are further repeated at repeating intervals, a length of the repeating intervals being a function of the eye parameter when in step 515 of determining, the type of movement has been determined to be the smooth eye movement. The length of the repeating intervals in the case of a large eye parameter is, in particular, shorter than in the case of a small eye parameter. Steps 505, 510, 515, 520, 525 of method 500 are also repeated in repeating time spans, a duration of one of the repeating time spans being increased when the eye parameter is smaller than the second reference values. For example, this results in an energy saving mode being activated, for example. Steps 505, 510, 515, 520, 525 of method 500 are further repeated at a repeating frequency when in step 515 of determining, the type of movement is determined to be the saccadic eye movement, the repeating frequency, in particular, being a function of the eye parameter or of a predefined frequency parameter. The type of movement is determined merely optionally in step 515 of determining to be a state of fixation of the eye when the eye parameter is smaller than the second reference parameter.

The method steps presented herein may be carried out repeatedly as well as in an order different from that described.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for recognizing a viewing direction and/or a state of an eye using a laser device, the method comprising the following steps:
   reading in an eye parameter, which represents a movement of the eye, using the laser device;
   comparing the eye parameter with a first reference parameter and with a second reference parameter differing from the first reference parameter, to obtain a comparison result;
   determining a type of movement of the eye using the comparison result, the type of movement representing a saccadic eye movement when the eye parameter has a greater value than the first reference parameter and the type of movement representing a smooth eye movement when the eye parameter has a value, which corresponds at least to the second reference parameter and at most to the first reference parameter; and
   ascertaining a viewing direction as a function of the determined type of movement, the viewing direction being ascertained when the type of movement represents the smooth eye movement and/or the viewing direction not being ascertained when the eye movement represents the saccadic eye movement,
   wherein the steps of the method are repeated at repeating intervals, a length of the repeating intervals being a function of the eye parameter when, in the step of determining, the type of movement has been determined to be the smooth eye movement the length of the repeating intervals being shorter in the case of a large eye parameter than in the case of a small eye parameter.

2. The method as recited in claim 1, wherein in the step of reading in, a value is read in as the eye parameter which represents an angle velocity of the eye and/or an acceleration of the eye.

3. The method as recited in claim 2, wherein in the step of determining, the type of movement is determined to be the smooth eye movement when the angle velocity is in a range between 25°/s and 80°/s.

4. The method as recited in claim 2, wherein in the step of determining, the type of movement is determined to be the smooth eye movement when the angle velocity is in a range between 30°/s and 75°/s.

5. The method as recited in claim 2, wherein in the step of determining, the type of movement is determined to be the saccadic eye movement when the angle velocity is in a range between 180°/s and 520°/s.

6. The method as recited in claim 2, wherein in the step of determining, the type of movement is determined to be the saccadic eye movement when the angle velocity is in a range between 200°/s and 500°/s.

7. The method as recited in claim 1, wherein the steps of the method are repeated in repeating time spans, a length of one of the repeating time spans being increased when the eye parameter is smaller than the second reference parameter.

8. The method as recited in claim 1, wherein the steps of the method are repeated at a repeating frequency when, in the step of determining, the type of movement is determined to be the saccadic eye movement, the repeating frequency being a function of the eye parameter or of a predefined frequency parameter.

9. The method as recited in claim 1, wherein in the step of determining, the type of movement is determined to be a state of fixation of the eye when the eye parameter is smaller than the second reference parameter.

10. The method as recited in claim 1, wherein prior to the step of reading in, a step of generating the eye parameter is carried out, the eye parameter being generated using a self-mixing laser Doppler interferometry.

11. The method as recited in claim 10, wherein in the step of generating, a light beam is output in a direction of the eye and a reflection beam is received, the light beam being output in an angular range between 40° and 50° relative to at least one of the main rotational axes of the eye, and/or the reflection beam being received in an angular range between 40° and 50° relative to at least one of the main rotational axes of the eye, the reflection beam being formed as a partial beam of the light beam.

12. A device configured to recognize a viewing direction and/or a state of an eye using a laser device, the device configured to:
   read in an eye parameter, which represents a movement of the eye, using the laser device;
   compare the eye parameter with a first reference parameter and with a second reference parameter differing from the first reference parameter, to obtain a comparison result;
   determine a type of movement of the eye using the comparison result, the type of movement representing a saccadic eye movement when the eye parameter has a greater value than the first reference parameter and the type of movement representing a smooth eye movement when the eye parameter has a value, which corresponds at least to the second reference parameter and at most to the first reference parameter; and
   ascertain a viewing direction as a function of the determined type of movement, the viewing direction being ascertained when the type of movement represents the smooth eye movement and/or the viewing direction not being ascertained when the eye movement represents the saccadic eye movement,
   wherein the steps of the method are repeated at repeating intervals, a length of the repeating intervals being a function of the eye parameter when, in the step of determining, the type of movement has been determined to be the smooth eye movement the length of the repeating intervals being shorter in the case of a large eye parameter than in the case of a small eye parameter.

13. A non-transitory machine-readable memory medium on which is stored a computer program for recognizing a viewing direction and/or a state of an eye using a laser device, the computer program, when executed by a computer, causing the computer to perform the following steps:
   reading in an eye parameter, which represents a movement of the eye, using the laser device;
   comparing the eye parameter with a first reference parameter and with a second reference parameter differing from the first reference parameter, to obtain a comparison result;

determining a type of movement of the eye using the comparison result, the type of movement representing a saccadic eye movement when the eye parameter has a greater value than the first reference parameter and the type of movement representing a smooth eye movement when the eye parameter has a value, which corresponds at least to the second reference parameter and at most to the first reference parameter; and ascertaining a viewing direction as a function of the determined type of movement, the viewing direction being ascertained when the type of movement represents the smooth eye movement and/or the viewing direction not being ascertained when the eye movement represents the saccadic eye movement, wherein the steps of the method are repeated at repeating intervals, a length of the repeating intervals being a function of the eye parameter when, in the step of determining, the type of movement has been determined to be the smooth eye movement the length of the repeating intervals being shorter in the case of a large eye parameter than in the case of a small eye parameter.

14. A laser device configured to recognize a state of the eye, comprising:

a laser unit configured to receive a reflection beam; and a device configured to recognize a viewing direction and/or a state of an eye using the laser device, the device configured to:

read in an eye parameter, which represents a movement of the eye, using the laser device, compare the eye parameter with a first reference parameter and with a second reference parameter differing from the first reference parameter, to obtain a comparison result, determine a type of movement of the eye using the comparison result, the type of movement representing a saccadic eye movement when the eye parameter has a greater value than the first reference parameter and the type of movement representing a smooth eye movement when the eye parameter has a value, which corresponds at least to the second reference parameter and at most to the first reference parameter, and ascertain a viewing direction as a function of the determined type of movement, the viewing direction being ascertained when the type of movement represents the smooth eye movement and/or the viewing direction not being ascertained when the eye movement represents the saccadic eye movement, wherein the steps of the method are repeated at repeating intervals, a length of the repeating intervals being a function of the eye parameter when, in the step of determining, the type of movement has been determined to be the smooth eye movement the length of the repeating intervals being shorter in the case of a large eye parameter than in the case of a small eye parameter.

* * * * *